(12) United States Patent
Evans et al.

(10) Patent No.: US 8,558,165 B2
(45) Date of Patent: Oct. 15, 2013

(54) NUCLEAR TOOL

(75) Inventors: Michael Evans, Missouri City, TX (US); Christian Stoller, Princeton, NJ (US)

(73) Assignee: Schlumberger Technology Corporation, Sugar Land, TX (US)

(\*) Notice: Subject to any disclaimer, the term of this patent is extended or adjusted under 35 U.S.C. 154(b) by 1454 days.

(21) Appl. No.: 12/025,481

(22) Filed: Feb. 4, 2008

(65) Prior Publication Data

US 2011/0168879 A1 Jul. 14, 2011

(30) Foreign Application Priority Data

Feb. 5, 2007 (EP) .................................. 07290143

(51) Int. Cl.
*G01V 5/08* (2006.01)

(52) U.S. Cl.
USPC ..................................................... 250/269.2

(58) Field of Classification Search
USPC ..................................................... 250/269.2
See application file for complete search history.

(56) References Cited

U.S. PATENT DOCUMENTS

| | | | |
|---|---|---|---|
| 3,379,882 A | | 4/1968 | Youmans |
| 4,129,777 A * | | 12/1978 | Wahl et al. ................... 250/264 |
| 4,233,839 A * | | 11/1980 | Coates ......................... 73/152.06 |
| 4,760,252 A * | | 7/1988 | Albats et al. ............. 250/390.07 |
| 4,825,073 A * | | 4/1989 | Smith et al. ................... 250/260 |
| 4,947,040 A * | | 8/1990 | Mahdavi et al. ............. 250/266 |
| 5,164,590 A * | | 11/1992 | Coles et al. ................... 250/255 |
| 5,210,691 A * | | 5/1993 | Freedman et al. ............... 702/7 |
| 5,282,133 A * | | 1/1994 | Watson ............................... 702/8 |
| 5,410,152 A * | | 4/1995 | Gadeken ....................... 250/260 |
| 5,419,405 A * | | 5/1995 | Patton ............................. 175/27 |
| 5,448,171 A * | | 9/1995 | Chemali et al. .............. 324/339 |
| 5,463,549 A * | | 10/1995 | Dussan et al. .................... 702/7 |
| 5,684,299 A * | | 11/1997 | DasGupta ................. 250/269.2 |
| 5,867,806 A * | | 2/1999 | Strickland et al. ................ 702/7 |
| 5,912,460 A * | | 6/1999 | Stoller et al. .............. 250/269.3 |
| 6,032,102 A * | | 2/2000 | Wijeyesekera et al. ........... 702/8 |
| 6,047,240 A * | | 4/2000 | Barber et al. ................... 702/10 |
| 6,163,348 A | | 12/2000 | Izumi et al. |
| 6,167,348 A * | | 12/2000 | Cannon ........................... 702/13 |
| 7,073,378 B2 * | | 7/2006 | Smits et al. ................. 73/152.14 |
| 7,567,869 B2 * | | 7/2009 | Nikitenko et al. ................ 702/7 |
| 2002/0059028 A1 * | | 5/2002 | Rozak ................................ 702/7 |
| 2002/0096363 A1 * | | 7/2002 | Evans et al. ..................... 175/41 |

(Continued)

FOREIGN PATENT DOCUMENTS

| | | |
|---|---|---|
| EP | 0552073 | 7/1993 |
| EP | 552073 A2 * | 7/1993 |
| EP | 718641 A2 * | 12/1995 |

OTHER PUBLICATIONS

Office action for the equivalent Mexican Patent application issued on Dec. 5, 2012.

*Primary Examiner* — David Porta
*Assistant Examiner* — Djura Malevic
(74) *Attorney, Agent, or Firm* — Stephanie Chi; Brigitte Jeffery Echols

(57) ABSTRACT

A nuclear measurement tool for determining properties of a formation penetrated by a borehole fluid. The tool comprising: a nuclear source for irradiating the formation and a a plurality of nuclear sensors each operating with a different depth of investigation into the formation. The tool further comprising processing means for receiving the data from the nuclear sensors and based thereon determining the properties of the formation by taking into account the penetration of the borehole fluid.

26 Claims, 3 Drawing Sheets

(56) References Cited

U.S. PATENT DOCUMENTS

| | | |
|---|---|---|
| 2005/0028586 A1* | 2/2005 | Smits et al. .............. 73/152.14 |
| 2005/0075789 A1* | 4/2005 | Xiao et al. ...................... 702/6 |
| 2006/0175057 A1* | 8/2006 | Mandal et al. ............. 166/254.2 |
| 2008/0030196 A1* | 2/2008 | Bespalov et al. ............. 324/339 |
| 2008/0033654 A1* | 2/2008 | Bespalov et al. ................ 702/7 |
| 2009/0093962 A1* | 4/2009 | Akkurt ........................... 702/11 |

* cited by examiner

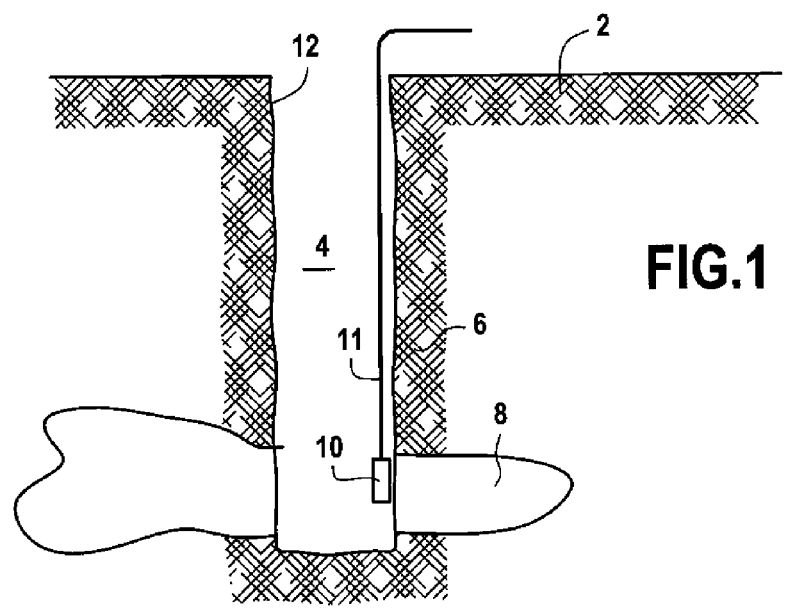
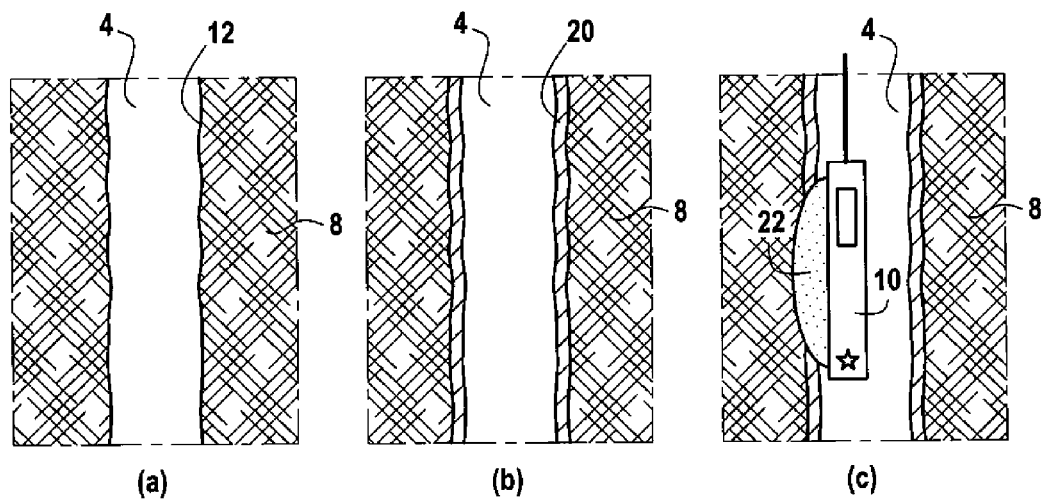
FIG.2

NUCLEAR TOOL

FIELD OF THE INVENTION

The invention relates to a tool for determining the depth of penetration of fluid into a formation.

BACKGROUND OF THE INVENTION

In the oil services industry after a particular hydrocarbon (oil or gas) reservoir has been discovered, the first stage of creating a producing well is concerned with drilling a borehole down into the earth's crust to reach the desired hydrocarbon reservoir.

During this drilling phase, often various measurement tools are mounted on, or close to, the tip of the drill so as to provide petroleum engineers with the most up-to-date data of the drilling and the surrounding formation. Specifically, during the drilling stage various sensors can be used, for example, to measure the resistivity and porosity of the surrounding formation and sending the results back to the surface for evaluation.

Even after the borehole has been drilled, it may be desirable to lower various measurement tools down the borehole in order to try and characterize the surrounding formation at different depths in the borehole. Such measurements are all useful in providing a more accurate characterization of the constituent elements of the surrounding formation. Specifically, one is able to obtain a more accurate estimate of the quality and quantity of hydrocarbon in the surrounding formation. The hydrocarbon fluid can either be in gas form (i.e. natural gas) or in liquid form (i.e. petroleum or petroleum with dissolved gas).

The formation surrounding a borehole typically comprises a plurality of different constituent materials including solids, such as different rocks or sands, and also the fluids whose quantity one wishes to measure. It is possible to distinguish between these constituent elements by measuring their respective densities and other properties. After or during the drilling process, fluid from the borehole may penetrate into the surrounding formation mixing with the fluid (hydrocarbon or water) and thereby distorting the measurement. The borehole fluid often has characteristics which are very different from those of the original formation fluid.

It is therefore desirable to estimate the level of penetration (or invasion) that occurs, in order to correct for it and obtain a more realistic measure of the actual hydrocarbon content.

SUMMARY OF THE INVENTION

According to one aspect of the present invention there is provided a nuclear measurement tool for determining at least one property of a formation penetrated by a borehole fluid, the tool comprising: a nuclear source for irradiating the formation; a plurality of nuclear sensors each operating with a different depth of investigation into the formation; and processing means for receiving the data from the nuclear sensors and based thereon determining the at least one property of the formation by taking into account the penetration of the borehole fluid.

Advantageously, wherein the tool is arranged to determine a plurality of properties simultaneously. This has the advantage of providing a simultaneous estimate of all properties inherently correction for the borehole fluid invasion.

Alternatively, wherein the properties comprise a measure of at least one of a sigma of mud filtrate, a sigma of formation, a Hydrogen index of mud filtrate, a Hydrogen index of formation, a density of mud filtrate, a density of formation rock, a borehole diameter, a tool standoff, a formation uninvaded fluid density and a radius of invading fluid.

Preferably, wherein the aforementioned values are determined as intermediate values for finally determining a porosity and a water saturation property for the formation.

According to another aspect of the present invention there is provided a nuclear measurement tool for determining an invasion profile of penetration of borehole fluid into a formation, the tool comprising: a nuclear source for irradiating the formation; a plurality of nuclear sensors each operating with a different depth of penetration into the formation; and processing means for receiving the data from the nuclear sensors and based thereon determining the invasion profile.

BRIEF DESCRIPTION OF THE DRAWINGS

Embodiments of the present invention will now be described by way of an example with reference to the accompanying drawings, in which:

FIG. 1 shows a borehole drilled in the earth's crust;

FIGS. 2a, 2b and 2c show various states of borehole invasion;

DETAILED DESCRIPTION OF EMBODIMENTS OF THE INVENTION

Figure 3:
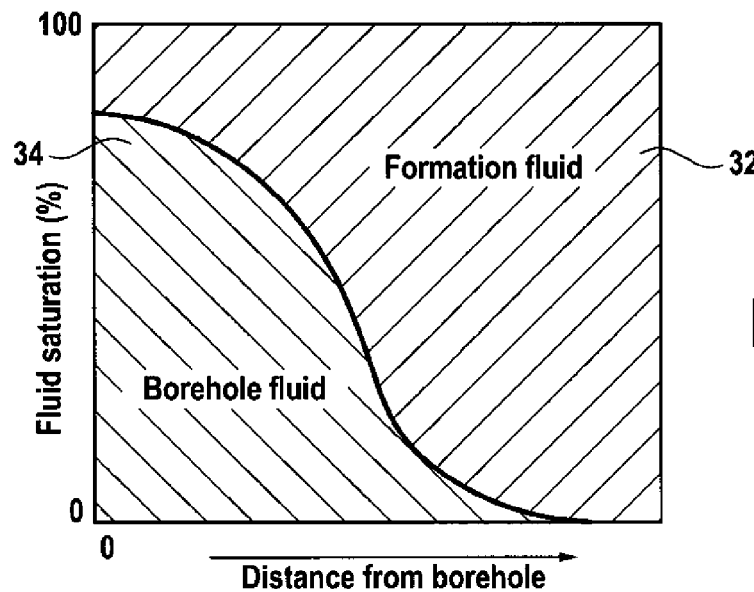
FIG. 3 shows a graph representing an example of an invasion profile into the formation.

FIG. 1 shows a basic configuration of a borehole 4 which is drilled below the earth's surface 2 and has a surrounding formation 6. The borehole is shown to extend vertically to a particular depth. Near the bottom of the borehole there is a surrounding hydrocarbon formation 8 whose properties around the borehole one would like to measure. In order to do this, a nuclear tool 10 is lowered to the corresponding depth, for example on a wire 12, to begin density measurements of the relevant hydrocarbon formation. Specifically, the nuclear tool is aligned alongside the interface 12 of the borehole and the formation and measurement can begin.

As a result of the drilling of the borehole, borehole fluid can begin invading the formation interface 12. The invasion of the borehole fluid into the formation 8 affects the readings of measurements taken by the tool 10 for determining the formation and the formation fluid properties. Typically, the borehole fluid has characteristics, which are very different from those of the original formation fluid. This will affect measurements, which probe the partially or completely invaded zone of the formation. The effect can be particularly noticeable when the properties of the borehole fluid are significantly different from those of the formation. Thus, it is advantageous for embodiments of the invention to be able to provide a more accurate measurement of the formation properties, by accounting for borehole fluid invasion.

While correction for formation invasion is common for resistivity measurements, which typically probe formation depths from several centimeters to several meters, nuclear measurements are typically limited to depths of investigation of less than 30 cm. Due to this smaller range, nuclear measurements are therefore more sensitive to borehole fluid invasion due to their sensitivity to invasion of 1 cm or less. This is particularly evident if a gas-filled formation is invaded by borehole fluid. The gas in the formation has a much lower density and hydrogen index (HI) than a typical borehole fluid. For example, the nuclear density measurement is sensitive to the electron density and thus the bulk density of the formation. Therefore, even shallow invasion can lead to an incorrect tool reading.

Some recent drilling techniques include using special formate muds (in particular, Na, K and Cs formate) that have densities spanning the range of conventional muds. For conventional muds the density is adjusted by the use of solid weighting materials (bentonite, barite, hematite), which are solids suspended in the liquid. In most cases only the liquid invades the formation. In the case of formate muds the liquid density can be very high and few solids are added to the mud. The invasion of the formation by the high density, high PEF, low HI fluid leads to significantly altered formation properties. If the depth of invasion is not known or not known well enough the measurements of the formation properties will be inaccurate.

Therefore, it is desirable to be able to correct nuclear measurements for invasion. Once an invasion profile has been determined, a further advantage is that the invasion profile determined from the nuclear measurements could be used to correct other logging measurements that are sensitive to invasion.

FIG. 2 is a sequence of slides a), b) and c) that show various states of borehole invasion. That is, FIG. 2a shows a sharp interface 12 between the borehole 4 and the formation 8 where there is no invasion. FIG. 2b shows a more blurred interface 20 reflecting partial invasion of the borehole fluid into the surrounding formation 12 and FIG. 2c shows a nuclear tool 10 taking measurement and having a zone of coverage which extends into the formation 8 and includes invasion from borehole fluid.

FIG. 3 shows an embodiment of an invasion profile into the formation. At the borehole wall 12 the borehole fluid 34 has displaced 80% of the formation fluid 32. It can be seen that the depth of penetration of the borehole fluid 34 decreases as the distance from the borehole wall 12 increases.

Figure 4:
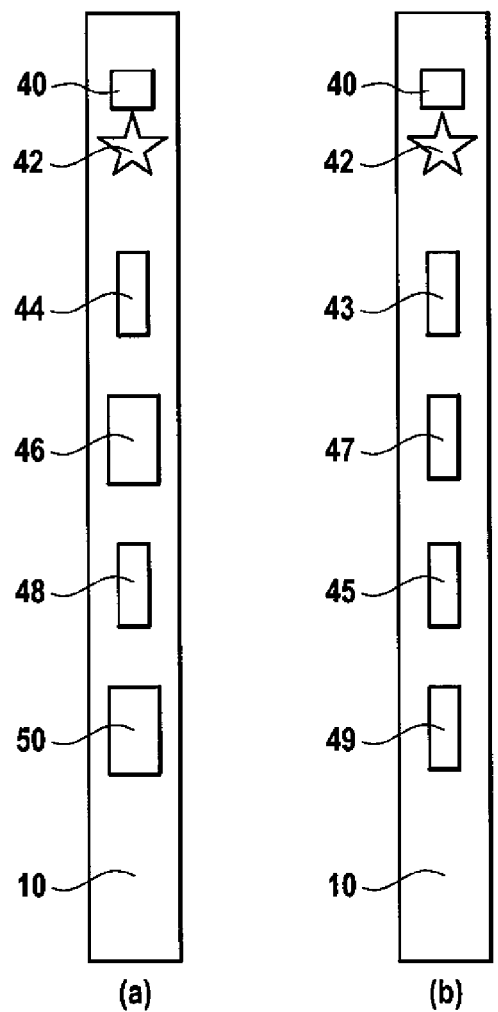
FIG. 4a shows a nuclear tool according to an embodiment of the present invention.
FIG. 4b shows a nuclear tool according to an alternative embodiment of the present invention.

FIG. 4a shows a nuclear tool 10 according to an embodiment of the present invention. Specifically, the tool 10 contains a pulsed neutron source 42, a near thermal neutron detector 44, a short spaced gamma-ray detector 46, a far thermal neutron detector 48 and a long spaced gamma-ray detector 50. In the preferred embodiment the neutron detectors 44, 48 are $^3$He tubes, the gamma-ray detectors 46, 50 are scintillation detectors coupled to photo-multipliers and the pulsed neutron source 42 is a d-T neutron generator. It should be appreciated that other configurations are also applicable. For example the tool could use only neutron (see FIG. 4b) or only gamma-ray detectors. The neutron source could also be a d-D generator. It is also possible for the neutron measurements to be combined with a resistivity measurement, i.e. some or all of the sensors of the resistivity measurement occupy the vertical positions, which overlap the positions of the detectors and/or source of the neutron measurement.

The pulsing scheme of the neutron source can be varied, hence the tool 10 allows the measurement of short times (short bursts) and long times through the use of longer intervals between bursts. Background determination (activation) can be done during longer "neutron-off" intervals.

Thus FIG. 4a shows the measurement tool consisting of a nuclear source for irradiating the surrounding formation and neutron and gamma-ray detectors at different spacings along the tool. In the FIG. 4a embodiment, the detectors perform various measurements. The neutron detectors 44, 48 are mainly sensitive to the HI (hydrogen index) of the formation. The first gamma-ray detector 46 is used to determine the lithology of the formation and its response is also sensitive to the bulk density of the formation and its hydrogen index. The second (long spaced) gamma-ray detector 50 is sensitive to the bulk density of the formation and to a lesser extent the hydrogen index of the formation.

FIG. 4b shows an alternative embodiment of the nuclear tool when all of the detectors are neutron detectors. Alternatively, all detectors could be gamma-ray detectors.

All detectors can measure time dependent information, which makes them suitable to determine the slowing down time of the neutrons and the thermal capture cross section of the formation (Sigma).

Figure 5:
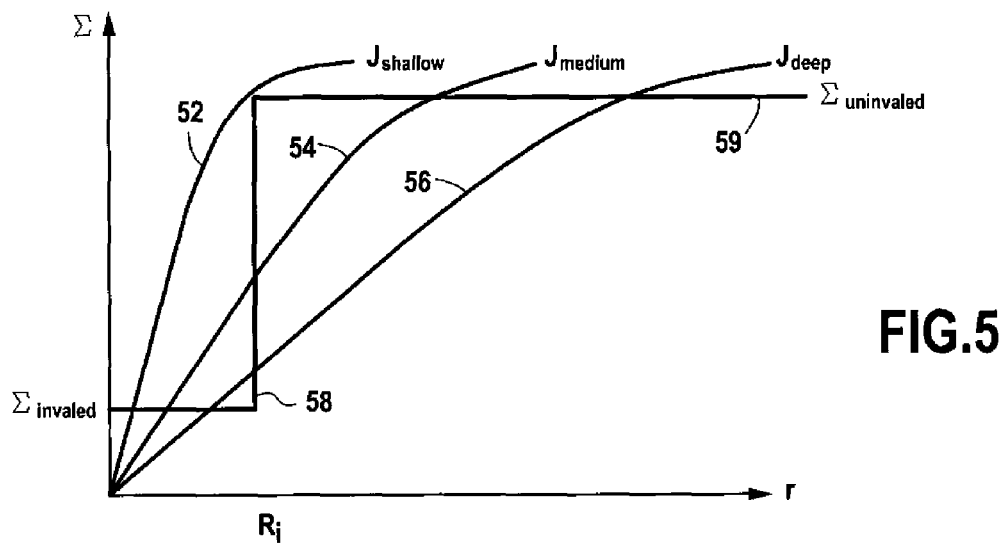
FIG. 5 shows a simple step-invasion profile according to one embodiment.

FIG. 5 shows an embodiment of how a simple invasion profile can be determined using multiple DOI (depth of investigation) sigma measurements. Other embodiments could use other measurements singly or in combination to determine the step profile. For example, the invasion profile could be determined by using multiple density measurements obtained from a single or multiple detectors. Alternatively, multiple HI (Hydrogen Index) or neutron porosity ($\phi$) measurements could be used. A combination of different measurements such as density, hydrogen index, sigma, PE (photoelectric) could be utilized to determine an invasion profile under a wide range of environmental conditions. The method for determining the invasion profile from a set of these measurements is similar regardless of the measurements chosen.

Specifically for the sigma measurement, FIG. 5 shows a simple step-invasion profile in which 3 unknowns need to be solved for $\Sigma_{invaded}$, $R_i$ and $\Sigma_{uninvaded}$. That is, the step-invasion profile has a constant sigma value ($\Sigma_{invaded}$) up to a depth $R_i$ into the formation and a different constant sigma value ($\Sigma_{uninvaded}$) for larger values of the radius, $R_i$.

In order to solve for these three unknowns at least three DOI's are necessary. These different DOI's are plotted as three different responses 52, 54 and 56 on FIG. 6. The shallowest measurement 52 should be sensitive mostly to the invaded zone to determine $\Sigma_{invaded}$. The deepest measurement 56 should be relatively insensitive to the invaded zone and have most of its response directed to the uninvaded zone to determine $\Sigma_{uninvaded}$. The third measurement 54 should have good sensitivity to both the invaded and uninvaded zones and should provide the information necessary to determine the radius of invasion, $R_i$.

In an alternative embodiment, it is possible to obtain an invasion profile estimate by only using two DOIs, but this would only be the situation when the effect of the borehole can be ignored. That is by taking different measurements from the two sensors it is still possible to solve for three or more unknown properties of the formation. For example, each sensor could give two or more distinct sigma values associated with different regions of the borehole and the formation. Thus, it is possible to derive more than one sigma for each sensor. Thus for each sensor a plurality of different sigmas could be obtained each associated with a different DOI in the borehole and formation.

Solving for the three unknowns can be accomplished by combining the three responses in a plurality of different ways including: forward model inversion, iteration starting with uncorrected (or estimated) values for the unknowns, response surface modeling, etc.

Thus, at least three DOI's are necessary to determine a simple invasion profile, the invasion profile being more accurate if the DOIs are at least significantly different to provide a greater measurement range There are a plurality of different ways for obtaining these different depths of response or DOI's. A first way is the spacing between the source and detector. For example, detectors that are longitudinally spaced further from the source along the tool, typically offer deeper penetration into the formation than a detector that is located closer to the source. A second way for varying the DOI is based on the type of particle detected. That is, different types of sensors are sensitive to different depths of penetration, for example a neutron or gamma ray sensor. It could therefore be possible to put a gamma-ray and a neutron detector at the same spacing from the source and yet have two different depths of investigation. A third way of varying the DOI is based on using different source timing (bursting) schemes. It should be appreciated that various combinations of the above could also be used. A fourth way of changing the depth of investigation involves changing the collimation (directionality) of the particles leaving the source and the particles/photons returning to a detector.

For the embodiments when the sigma measurement is used to determine an invasion profile, the first two methods, i.e. spacing and sensor type, are most effective in producing significantly different DOIs as shown in the nuclear tool of FIG. 4a. In such a preferred embodiment, both the spacing of the sensors and different sensor types are used in a way, which advantageously provides the most diverse DOIs, yielding the most accurate results for invasion during nuclear measurements.

Thus, according to a preferred embodiment, the depth of investigation of the thermal capture measurement (sigma) depends strongly on the detector spacing and on the type of measurement:

The neutron measurements that use sensors sensitive to thermal or epithermal neutrons 44, 48 have a shallower depth of investigation than the gamma-ray measurements 46, 50, which detect gammas-rays returning from the formation after neutron capture.

Typically, the depth of investigation of the different measurements increases with increasing distance from the sensor to the source. The sigma measurement of the long-spaced sensor 50 is therefore less affected by invasion than the sigma measurement of the short spaced gamma-ray sensor 46.

The depth of investigation of the far neutron sensor 48 is deeper than the depth of investigation of the near neutron sensor 44.

The depth of investigation of the far gamma-ray sensor 50 is deeper than the depth of investigation of the near gamma-ray detector 46.

If several simultaneous or almost simultaneous measurements of the same section of the formation can be performed with different depths of investigation it becomes possible to determine the depth of invasion and potentially the invasion profile. This is accomplished by using one or more parameters relating to formation invasion and adjusting them in such a way as to obtain a consistent answer from all the sensors. If the sensors are not combined it may be necessary to include the time dependence of the invasion.

By applying additional sensors with relatively unique DOIs, i.e. over and above the three required to solve for the three unknowns, one is able to get an improved estimate of the invasion profile. This is particularly useful for more accurately resolving the radius (or depth) of invasion Ri. Whereas, a simple step-invasion model has been shown, it should be appreciated that more intricate invasion model curves can be used. Additional sensors with different depths of investigation would allow a more detailed determination of the invasion profile. Thus, the more DOIs measured, the more curved (or accurate) the invasion profile becomes, which ultimately means a more accurate determination of the properties of the formation. There is an engineering trade-off in that a more accurate invasion profile requires more processing, whereas a simpler model with less processing may be preferred depending on the situation.

The nuclear tool shown in the embodiments of FIGS. 4a and 4b can be applied to a plurality of different measurement processes. The advantage of using different types of sensors and measurement procedures is that different properties can be measured depending on the requirements.

A first measurement procedure is now described as containing the following steps:
1. Measure the individual (apparent responses for each detector)
   a. HI response (near and far)
   b. Density response (short spaced and long spaced)
   c. Sigma response (all detectors)
2. Compute compensated HI (from near and far) assuming no invasion
3. Compute compensated neutron gamma density (near, short spaced and long spaced) assuming no invasion
4. Compute formation sigma from all detectors
5. Calculate invasion profile from Sigma
6. Correct answers from 2 and 3 for invasion The final answers as calculated at step 6 are of interest, since they are compensated measurements, which are fully corrected for invasion, or provide an indication that the invasion is too deep to allow a reliable correction. The multi-DOI sigma measurement is suited to give a good estimate of the depth of invasion. Once this is known the density and HI measurements can be corrected for the impact of the invasion and an accurate measurement of the porosity will be available.

Alternatively:
1. Compute all the apparent quantities (HI, Density, Sigma)
2. Enter into forward model using invasion
3. Invert the data set to obtain the optimal solution for HI, Density, Sigma and Invasion This procedure, using a forward model and inversion, is mathematically more difficult to perform, but offers the major advantage of providing an answer which uses all the information available. Every measured value Mj can be written as a function of formation, mud filtrate and environmental variables $$M_j = F(\Sigma_m, \Sigma_f, HI_m, HI_f, \rho_m, \rho_f, \rho_{fl}, \Phi_f, S_w, R_i, D_b, SO, \ldots)$$

where
$M_j$ = measurement from sensor j
$F$ = functional dependence
$\Sigma_m$ = sigma of mud filtrate
$\Sigma_f$ = sigma of formation
$HI_m$ = Hydrogen index of mud filtrate
$HI_f$ = Hydrogen index of formation
$\rho_m$ = density of mud filtrate
$\rho_f$ = density of formation rock
$\phi_f$ = porosity of formation rock
$S_w$ = water saturation of formation fluid
$D_b$ = borehole diameter
$SO$ = tool standoff
$\rho_{fl}$ = formation fluid density (uninvaded)
$R_i$ = radius of invading fluid (step function profile)

If we assume that the sensor measurements have been environmentally corrected so that we can restrict our attention to the first eight variables (formation and mud filtrate) and we consider a tool making eight measurements (by way of example), then we have:

$M_1 = a_{11}\Sigma_m + a_{12}\Sigma_f + a_{13}HI_m + a_{14}HI_f + a_{15}\rho_m + a_{16}\rho_f + a_{17}\rho_{fl} + a_{18}R_i$ $M_2 = a_{21}\Sigma_m + a_{22}\Sigma_f + a_{23}HI_m + a_{24}HI_f + a_{25}\rho_m + a_{26}\rho_f + a_{27}\rho_{fl} + a_{28}R_i$ $M_3 = a_{31}\Sigma_m + a_{32}\Sigma_f + a_{33}HI_m + a_{34}HI_f + a_{35}\rho_m + a_{36}\rho_f + a_{37}\rho_{fl} + a_{38}R_i$ $M_4 = a_{41}\Sigma_m + a_{42}\Sigma_f + a_{43}HI_m + a_{44}HI_f + a_{45}\rho_m + a_{46}\rho_f + a_{47}\rho_{fl} + a_{48}R_i$ $M_5 = a_{51}\Sigma_m + a_{52}\Sigma_f + a_{53}HI_m + a_{54}HI_f + a_{55}\rho_m + a_{56}\rho_f + a_{57}\rho_{fl} + a_{58}R_i$ $M_6 = a_{61}\Sigma_m + a_{62}\Sigma_f + a_{63}HI_m + a_{64}HI_f + a_{65}\rho_m + a_{66}\rho_f + a_{67}\rho_{fl} + a_{68}R_i$ $M_7 = a_{71}\Sigma_m + a_{72}\Sigma_f + a_{73}HI_m + a_{74}HI_f + a_{75}\rho_m + a_{76}\rho_f + a_{77}\rho_{fl} + a_{78}R_i$ $M_8 = a_{81}\Sigma_m + a_{82}\Sigma_f + a_{83}HI_m + a_{84}HI_f + a_{85}\rho_m + a_{86}\rho_f + a_{87}\rho_{fl} + a_{88}R_i$ Each equation relates the response of a tool sensor to the eight formation and mud filtrate variables. The coefficients $a_{ij}$ for each sensor equation are determined by fitting the equation to responses in known laboratory conditions (the eight variables are well characterized and can be varied over their applicable ranges). In matrix form this can be written as $$M = AV$$

where
$M = [M_1\ M_2\ M_3\ M_4\ M_5\ M_6\ M_7\ M_8]$ is a vector of sensor measurements, $A = [a_{11}\ a_{12}\ a_{13}\ a_{14}\ a_{15}\ a_{16}\ a_{17}\ a_{18}$
$\phantom{A = [}a_{21}\ a_{22}\ a_{23}\ a_{24}\ a_{25}\ a_{26}\ a_{27}\ a_{28}$
$\phantom{A = [}a_{31}\ a_{32}\ a_{33}\ a_{34}\ a_{35}\ a_{36}\ a_{37}\ a_{38}$
$\phantom{A = [}a_{41}\ a_{42}\ a_{43}\ a_{44}\ a_{45}\ a_{46}\ a_{47}\ a_{48}$
$\phantom{A = [}a_{51}\ a_{52}\ a_{53}\ a_{54}\ a_{55}\ a_{56}\ a_{57}\ a_{58}$
$\phantom{A = [}a_{61}\ a_{62}\ a_{63}\ a_{64}\ a_{65}\ a_{66}\ a_{67}\ a_{68}$
$\phantom{A = [}a_{71}\ a_{72}\ a_{73}\ a_{74}\ a_{75}\ a_{76}\ a_{77}\ a_{78}$
$\phantom{A = [}a_{81}\ a_{82}\ a_{83}\ a_{84}\ a_{85}\ a_{86}\ a_{87}\ a_{88}]$ is a matrix of coefficients, and $V = [\Sigma_m\ \Sigma_f\ HI_m\ HI_f\ \rho_m\ \rho_f\ \rho_{fl}\ R_i]$ is a vector of known formation and mud filtrate properties. Thus, it is possible to solve for A under laboratory conditions.

This matrix equation describes the functional relationship between sensor responses and the formation variables measured under known (laboratory or modeling) conditions. This is also known as the forward model of the responses.

While logging in the field, the inverse process must be used. That is, while logging downhole it is desired to actually solve for the formation properties while logging $V_{log}$. Thus, we need to invert the equation and solve for $V_{log}$ with the A matrix already known and loaded into memory of the tool, using the inverted equation $V_{log} = M_{log} A^{-1}$.

That is, for each vector (set) of measured sensor responses $M_{log}$ acquired in a well, we want to compute a vector of inferred formation and mud filtrate properties $V_{log} = [\Sigma_m\ \Sigma_f\ HI_m\ HI_f\ \rho_m\ \rho_f\ \rho_{fl}\ R_i]$. For the simple example given here, the sensor responses are linear in both the coefficients A and the formation properties $V_{log}$, permitting the simple solution: $V_{log} = M_{log} A^{-1}$, where the inverse matrix $A^{-1}$ can be computed from A using standard matrix inversion techniques. In more complicated cases involving sensor responses that are nonlinear in either the coefficients A, the formation properties V, or both, least squares or other techniques can be used to obtain a solution.

Regardless of the solution method chosen, the result of the inversion is a vector of formation and mud filtrate properties $V_{log} = [\Sigma_m\ \Sigma_f\ HI_m\ HI_f\ \rho_m\ \rho_f\ \rho_{fl}\ R_i]$ that are inherently corrected for fluid invasion (assuming a step invasion profile). The properties of the invading mud filtrate are simultaneously determined along with the radius of invasion.

Thus, to summarize briefly, an A matrix is created and loaded into a memory of the tool. The A matrix comprises a set of coefficients determined under laboratory conditions relating sensor responses to formation properties. With the A matrix known, the tool is able to take measurements in the field (downhole), and based thereon is able to solve for the actual properties to be measured for the formation. Specifically, the formation properties can be easily achieved by performing a matrix multiplication of the inverted A matrix with the measured responses taken while logging the formation downhole.

Thus, while more processing is perhaps required, the advantage of this procedure is that a range of corrected values is produced simultaneously and are inherently corrected for borehole fluid invasion.

It should be appreciated that the $M_j$ vector could instead also be manipulated to solve for two main properties of the formation, i.e. $M_j = F(\phi, S_w)$,
Where:
$\phi$ = porosity, and
$S_w$ = water saturation Alternatively, an intermediate step of solving for $M_j = F(\Sigma_m, \Sigma_f, HI_m, HI_f, \rho_m, \rho_f, \Phi_f, R_i, D_b, SO, \ldots)$ could be performed and using these as intermediate results for determining the porosity $\phi$ and water saturation $S_w$ properties of the formation.

A further measurement procedure includes the following:
1. Use information from the resistivity measurement for deeper invasion (detect full invasion)
2. Use epithermal measurement (count rate and slowing down time) to determine the profile of shallow invasion.

Resistivity has a much deeper depth of investigation than nuclear tools. Thus this procedure has the advantage that if the invasion depth exceeds the depth of investigation of the nuclear measurement and the resistivity indicates the presence of invasion, then the nuclear tool measurements can be corrected for full invasion. Alternatively, if the invasion is very shallow, then slowing down time may offer a sensitive determination of shallow invasion. Since the DOI of this measurement is only of the order of 2 to 4 cm.

Another possible procedure is as follows:
1. Correct the standard gamma-gamma measurement using the invasion profile determined above
2. Include the gamma-gamma apparent densities in the forward model and inversion While the tool described above is an LWD tool, similar tools can be envisaged for other modes of conveyance. The standard gamma-gamma measurement is the traditional nuclear density measurement relying on Compton scattering of gamma-rays. This is a measurement that is separate from the neutron measurement. Thus, the advantage of this procedure is that if the depth of invasion is deep, the gamma-gamma density may give an incorrectly derived porosity measurement, because of an incorrect assumption of the density of the formation fluid. Also, for a so-called PEx density tool, one could take advantage of the MCFL (which is a type of shallow resistivity measurement) to add information on shallow invasion to obtain a correct density reading in the presence of shallow invasion.

Figure 6:
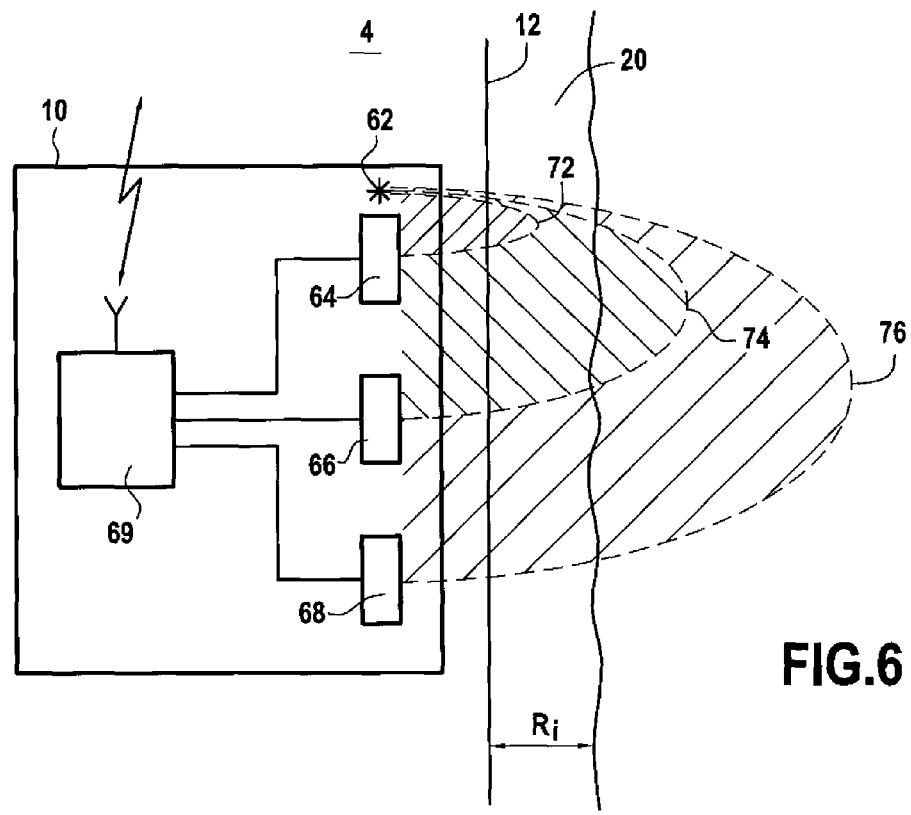
FIG. 6 shows a nuclear tool according to an embodiment of the invention located downhole and measuring the invasion profile.

FIG. 6 shows a nuclear tool according to an embodiment of the invention located downhole and measuring the invasion profile. FIG. 6 shows a nuclear tool 10 which is aligned alongside the borehole wall 12 for determining an invasion profile 20 of the borehole fluid into the surrounding formation. The nuclear tool is shown as having three sensors 64, 66 and 68 that are all spaced at a different distance from the nuclear source 62. The closest sensor 64 has the shortest DOI into the formation represented by the zone coverage 72. The middle sensor 66 has a deeper penetration into the formation represented by zone 74. The furthest sensor 68 has the deepest penetration into the formation represented by zone coverage 76. These are three relatively distinct DOI's and thus allow a reasonable accurate invasion profile to be determined, specifically the Ri, which indicates the depth of penetration of the borehole fluid into the formation.

The sensors 64, 66 and 68 all receive their respective nuclear measurements and forward these onto a processor 69, which is able to collate the measurements that for example might be simultaneously received from all three sensors. While the processor is shown as existing on the nuclear tool itself, and the invasion profile can be conveyed for example by wireline or wireless telemetry to the surface; an alternative embodiment would allow the raw data received from the sensors to be sent directly to the surface for processing. In any event, the processing circuitry 69 is responsible for collating results and applying whichever measurement procedure is most relevant for displaying relevant data, with the effects of borehole invasion being corrected for or determined.

The invention claimed is:

1. A nuclear measurement tool for determining at least one property of a formation penetrated by a borehole fluid, the tool comprising:
   a nuclear source for irradiating the formation;
   a plurality of nuclear sensors each operating with a different depth of investigation into the formation; and
   processing means for receiving data from the nuclear sensors and based thereon: a) determining a level of penetration of the borehole fluid into the formation; and, b) determining the at least one property of the formation taking into account the level of penetration of the borehole fluid.

2. The nuclear measurement tool of claim 1, wherein the nuclear sensors are each configured to measure time dependent information for determining a thermal capture cross-section measurement of the formation.

3. The nuclear measurement tool of claim 1, wherein the depth of investigation of at least one of the sensors depends on a distance at which the nuclear sensor is spaced from the nuclear source.

4. The nuclear measurement tool of claim 1, wherein the depth of investigation of at least one of the nuclear sensors depends on a type of the sensor.

5. The nuclear measurement tool of claim 1, wherein the depth of investigation of at least one of the nuclear sensors depends on a type of the sensor and on a distance at which the sensor is spaced from the nuclear source.

6. The nuclear measurement tool of claim 1, further comprising one or more sensors chosen from resistivity, sonic and ultrasonic type sensors, and wherein the processing means further determines the at least one property of the formation based upon data received from the plurality of nuclear sensors and the one or more sensors.

7. The nuclear measurement tool of claim 1, wherein the formation contains a hydrocarbon fluid having a density that is lower relative to that of the borehole fluid.

8. The nuclear measurement tool of claim 1, wherein the processing means has a unit for determining an invasion profile providing a depth of the penetration of the borehole fluid into the formation.

9. The nuclear measurement tool of claim 8, wherein the invasion profile provides an indication of a level of the borehole fluid that has invaded the formation at different depths.

10. The nuclear measurement tool of claim 1, wherein each of the plurality of nuclear sensors is spaced along a length of the tool at different distances from the nuclear source.

11. The nuclear measurement tool of claim 1, wherein the plurality of sensors are three nuclear sensors.

12. The nuclear measurement tool of claim 11, wherein each of the three nuclear sensors are configured to operate at different depths of investigation into the formation.

13. The nuclear measurement tool of claim 1, wherein the nuclear source is a pulsed neutron source.

14. A method for downhole measurement of a formation using the nuclear tool of claim 1, the method comprising the steps of:
   a) measuring a response of the nuclear tool for a plurality of properties to be determined;
   b) determining a compensated value of the properties to be determined without penetration of the borehole fluid;
   c) determining an invasion profile for the formation being measured based on the measured response of at least one of the properties to be determined; and
   d) correcting for the compensated value of at least some of the properties to be determined obtained in step b) with the invasion profile in step c).

15. The method of claim 14, wherein the plurality of properties for which a response is measured in step a) are an HI response, a density response and a sigma response, wherein for step b) at least two of the three responses are compensated for, wherein for step c) the invasion profile is determined based on the remaining response; and wherein for step d) the two properties having compensated responses are corrected with the invasion profile determined based on the remaining response.

16. A method for downhole measurement of a formation using the nuclear tool of claim 1, the method comprising the steps of:
   a) measuring an HI response, a neutron gamma density response and a sigma response with corresponding nuclear sensors on the nuclear tool;
   b) determining compensated HI without invasion;
   c) determining compensated neutron gamma density without invasion;
   d) determining the sigma response from all nuclear sensors;
   e) determining an invasion profile of the formation being measured based on the sigma response determined; and
   f) correcting the compensated HI and neutron gamma density measurements obtained in steps b) and c) with the invasion profile determined in step e).

17. A method for downhole measurement of a formation using the nuclear tool of claim 1, the method comprising the steps of:
   a) measuring an HI response, a neutron gamma density response and a sigma response with corresponding nuclear sensors on the nuclear tool;
   b) determining sigma response without invasion;
   c) determining compensated neutron gamma density without invasion;
   d) determining the HI response from all nuclear sensors;
   e) determining an invasion profile of the formation being measured based on the HI response determined; and
   f) correcting the compensated sigma and neutron gamma density measurements obtained in steps b) and c) with the invasion profile determined in step e).

18. A method for downhole measurement of a formation using the nuclear tool of claim 1, the method comprising the steps of:
  a) measuring an HI response, a density response and a sigma response with corresponding nuclear sensors;
  b) performing a forward model calculation using invasion for combining the measured responses to produce a data set; and
  c) performing an inversion on the data set to simultaneously obtain an optimal solution for HI, density, sigma and invasion.

19. A method for downhole measurement of a formation using the nuclear tool of claim 6, the method comprising the steps of:
  a) performing a resistivity measurement for determining a deeper invasion of the borehole fluid into the formation;
  b) performing an epithermal measurement of a count rate and slowing down time for determining a shallower invasion of the borehole fluid into the formation.

20. A method for downhole measurement of a formation using the nuclear tool of claim 1, the method comprising the steps of:
  a) measuring a gamma-gamma response for determining a nuclear density measurement relying on a scattering of gamma-rays,
  b) correcting the gamma-gamma response using a determined invasion profile; and
  performing forward model and inversion for combining measured responses for HI, density and sigma with the corrected gamma-gamma response to simultaneously obtain an optimal solution for HI, density, sigma and invasion.

21. The nuclear measurement tool of claim 1, wherein each nuclear sensor is configured to determine a plurality of sigmas.

22. The nuclear measurement tool of claim 21, wherein each of the plurality of sigmas is associated with a different depth of investigation into the formation.

23. The nuclear tool of claim 1, wherein the tool comprises a plurality of nuclear sources for irradiating the formation.

24. The nuclear tool of claim 1, wherein the tool is for determining a plurality of properties simultaneously.

25. The nuclear tool of claim 24, wherein the plurality of properties comprise a measure of at least one of a sigma of mud filtrate, a sigma of formation, a Hydrogen index of mud filtrate, a Hydrogen index of formation, a density of mud filtrate, a density of formation rock, a porosity of formation rock, a water saturation of formation fluid, a borehole diameter, a tool standoff, a formation uninvaded fluid density and a radius of invading fluid.

26. A nuclear measurement nuclear tool for determining an invasion profile of penetration of a borehole fluid into a formation, the tool comprising:
  a nuclear source for irradiating the formation;
  a plurality of nuclear sensors each operating with a different depth of investigation into the formation; and
  processing means for receiving data from the nuclear sensors and based thereon determining the invasion profile;
  wherein at least one of the plurality of nuclear sensors is a gamma ray detector and the gamma ray detector is positioned below the nuclear source.

* * * * *